Oct. 23, 1928.
C. E. SODERMAN
1,688,440
THERMO FISH RECEPTACLE
Filed Aug. 2, 1927
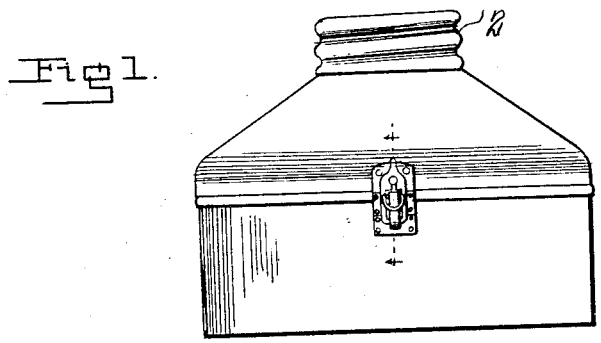
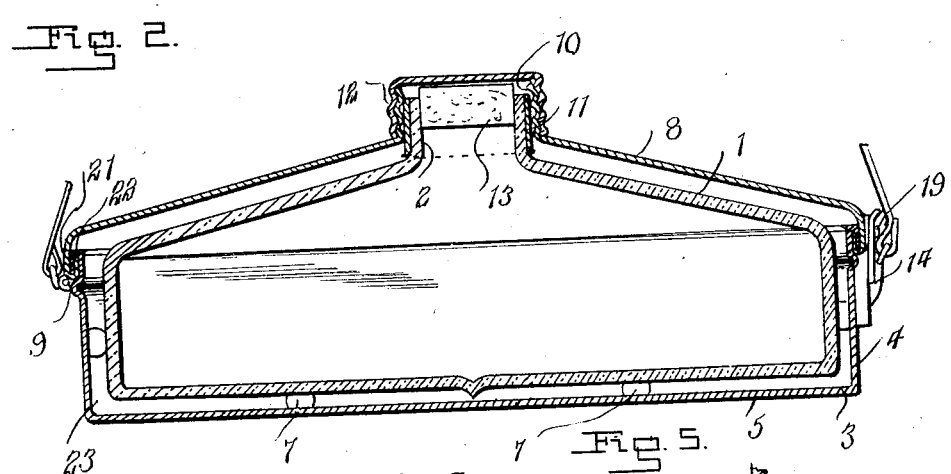
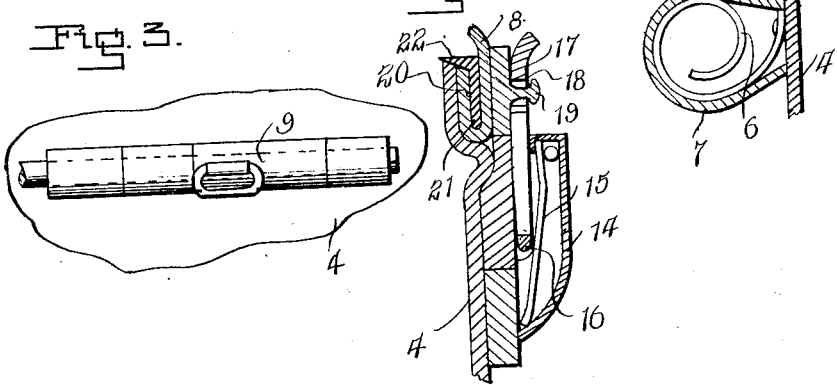
Inventor
C. E. Soderman
By Lacey & Lacey, Attorneys Patented Oct. 23, 1928.

1,688,440

UNITED STATES PATENT OFFICE.

CHARLES E. SODERMAN, OF ISHPEMING, MICHIGAN.

THERMO FISH RECEPTACLE.

Application filed August 2, 1927. Serial No. 210,149.

The present invention is directed to improvements in thermo fish receptacles.

The primary object of the invention is to provide a device of this type so constructed that the fish caught can be placed in the receptacle and maintained in good condition until ready for use, provisions being made for maintaining the water in the receptacle in a cool condition.

Another object of the invention is to provide a device of this character so constructed that should the water containing receptacle become broken the outer casing can be conveniently manipulated in order that the inner receptacle can be removed and a new one substituted therefor.

In the accompanying drawing:

Figure 1 is an end view of the device.

Figure 2 is a longitudinal sectional view through the same.

Figure 3 is a fragmentary end view.

Figure 4 is a sectional view on line 4—4 of Figure 1.

Figure 5 is a detail sectional view of one of the shock absorbing and spacing devices.

Referring to the drawing, 1 designates the inner receptacle which is formed from glass and provided with a neck 2. The outer casing consists of a metallic bottom section 3 provided in an upstanding wall 4, the wall and bottom 5 thereof having coil springs 6 carried thereby and which are covered with sheets of rubber 7 which, in connection with the springs, constitute resilient spacers or shock absorbers for the inner receptacle.

A sheet metal cover 8 is provided for the bottom section and is hingedly connected, as at 9, to one end of the bottom section, said cover having a centrally located threaded neck 10 which is adapted to confine the neck 2 when the cover is closed, there being a straw board collar 11 encircling the neck 2 to form an air-tight joint between said neck and the neck 10. A cap 12 is employed and is threaded upon the neck 10, there being a cork 13 for closing the neck 2.

To the end wall of the bottom section opposite the hinge connection is secured a casing 14 in which is mounted a leaf spring 15 adapted to coact with the bar 16 of the hasp 17 to hold the same firmly closed. The hasp is provided with an opening 18 for engagement with the studs 19 carried by the cover 8.

It will be obvious that upon releasing the hasp that the cover can be swung open in order that the inner receptacle can be conveniently removed from the bottom section should the occasion arise.

The cover 8 is turned to provide a channel 20 in which is secured a rubber packing 21 having an overhanging ledge 22 adapted to rest upon the upper edge of the wall 4 to provide an air-tight joint when the cover is in its closed position. A space 23 is provided around the inner receptacle to maintain the water therein in a cool state.

If desired a small piece of ice may be placed in the inner receptacle with the water so that the water will be maintained comparatively cold so that when the fish are placed in the inner receptacle they will be preserved for a considerable length of time after being caught.

The device is of such size that it can be conveniently carried and as the fish are caught they can be placed in the inner receptacle upon removing the cap 12 and cork 13.

Having thus described the invention, I claim:

1. A device of the class described comprising an inner receptacle, an outer container including a bottom section and a body section having springs carried thereby for engagement with the inner receptacle, a cover for the inner receptacle, hingedly connected to the body section, said cover having a channel carried thereby, a packing fitted in the channel and having a ledge for engaging the upper edge of the body section when the cover is closed, and necks carried, respectively, by the inner receptacle and cover for interfitting engagement.

2. A device of the class described, comprising an inner receptacle, and an outer container including a bottom section and a body section, and springs fixed to bottom section and body section, said springs being confined by elastic sheets.

In testimony whereof I affix my signature.

CHARLES E. SODERMAN. [L. S.]